United States Patent [19]

Steeves

[11] Patent Number: 4,729,164

[45] Date of Patent: Mar. 8, 1988

[54] DRIVING TOOL AND MAGAZINE FOR TANDEM-TYPE PUSH-ON CLIPS

[75] Inventor: Jay M. Steeves, Cincinnati, Ohio

[73] Assignee: Senco Products, Inc., Cincinnati, Ohio

[21] Appl. No.: 892,863

[22] Filed: Aug. 4, 1986

[51] Int. Cl.[4] .......................... B25C 1/04; B21J 15/28; B23Q 7/10

[52] U.S. Cl. .......................................... 29/809; 29/525; 227/86; 227/156; 227/120; 227/95

[58] Field of Search .......................... 29/229, 525, 809; 227/86, 92, 95, 120, 130, 156

[56] References Cited

U.S. PATENT DOCUMENTS

| | | | |
|---|---|---|---|
| 1,709,756 | 4/1929 | Szepe | 227/95 |
| 2,701,360 | 2/1955 | Lang | 227/95 |
| 3,477,629 | 11/1969 | Becht | 227/130 |
| 3,846,900 | 11/1974 | Weglage | 29/229 |
| 4,630,766 | 12/1986 | Steeves et al. | 227/130 X |

FOREIGN PATENT DOCUMENTS

| | | | |
|---|---|---|---|
| 321751 | 11/1929 | United Kingdom | 227/95 |

*Primary Examiner*—Paul A. Bell
*Attorney, Agent, or Firm*—Frost & Jacobs

[57] ABSTRACT

A tandem clip system comprising a driving tool and a magazine for push-on clips of the type adapted to engage the post of a workpiece extending through a perforation in an element to which the workpiece is to be fastened. The push-on clips are arranged in tandem fashion in a strip thereof. Each clip comprises an integral part of the next adjacent clip with a line of weakening therebetween. The driving tool is conventional, having a driver and actuating means therefor. The driver is provided with a modified tip for severing the forwardmost clip from its strip and driving it on its respecting work piece post. The tool has a modifed guide body with a drive track for the driver tip. The clip feed mechanism is affixed to the guide body and actuated by the driver tip to advance the forwardmost clip to the drive track after each tool actuation. The guide body also has a clip support assembly for supporting each clip in the drive track including the last clip of a strip. A magazine for the clip strip is removably mounted on and supported by the tool.

10 Claims, 50 Drawing Figures

DRIVING TOOL AND MAGAZINE FOR TANDEM-TYPE PUSH-ON CLIPS

TECHNICAL FIELD

The invention relates to a tandem push-on clip system, and more particularly to a driving tool and a magazine for such clips.

BACKGROUND ART

Push-on clips are conventional and well known in the art. Each clip comprises a relatively thin, slightly domed member of resilient metal. Each clip has a central perforation of X-shaped configuration. A workpiece, adapted to be affixed to a surface of an element, is provided with an integral post extending through a perforation in the element. A clip is forced over the post. The X-shaped perforation in the clip defines four substantially triangular lobes which are distorted in a direction opposite to the direction of movement of the clip as it passes down the post. These lobes firmly and frictionally engage the post, precluding removal of the clip, so that the workpiece is firmly affixed to the surface of the element through which its post extends.

Such push-on clips are available in strips, wherein each clip constitutes an integral, one-piece part of the adjacent clip with a line of weakening formed therebetween. The lines of weakening enable each clip, in its turn, to be broken away from its strip.

The present practice is to install such push-on clips by use of a rubber mallet, a hand-held fixture tool, or by fixed bench type systems.

Applications of such clips by hand is time consuming. In the usual procedure, the workman grasps a strip of clips, locating the forwardmost clip of the strip over the post. Once the clip has been applied, it must be severed from the strip. Sometimes in doing this, the strip does not break between the forwardmost clip applied to the post and the next adjacent clip, but rather breaks at a point a number of clips removed from the applied clip. It is not unusal for the excess clips to simply remain attached to the applied clip, the workman next applying the forwardmost clip of the strip remaining in his hand. This results in a considerable loss or waste of clips.

The present invention is based upon the discovery that a conventional, hand-held fastener driving tool can be converted for use in applying push-on clips of the type under consideration. Furthermore, the tool may be provided with a magazine holding a large quantity of such push-on clips. The magazine is easily changed and can be either refillable and reusable, or disposable, as will be apparent hereinafter.

The tandem push-on clip system of the present invention is more mobile, speeds assembly, and eases arm and hand strain. The system enables the worker to move about freely, and he is no longer tied to a fixed work station. By making the cartridge easy to change, faster application of large quantities of clips results, without loss or waste. As will be apparent hereinafter, the driver mechanism that sets the clip onto its post also is used to shear the clip from its strip and further activates a clip feed mechanism. Since the bottom of the tool guide body is exposed, the workman is enabled to positively locate and position each fastener on its respective post. The last fastener of a strip is held in position by means of a finger/spring arrangement that prevents it from dropping out of the tool.

DISCLOSURE OF THE INVENTION

According to the invention there is provided a tandem push-on clip system utilizing a strip of push-on clips arranged in tandem, each clip comprising an integral part of the next adjacent clip with a line of weakening located therebetween. The system comprises a driving tool and a magazine for the clips. The driving tool is conventional and is of the type having a driver and actuating means therefor. The driver is provided with an appropriately modified tip which serves both to drive the forwardmost clip of the strip onto its respective workpiece post, and also to sever the forwardmost clip from the clip strip.

To accommodate the modified driver tip and the clips, the driving tool is provided with a modified guide body having an appropriately configured drive track. A clip feed mechanism is mounted on the glide body. The clip feed mechanism comprises a housing having a clip strip guide which directs the forwardmost clip to the drive track. The clip feed mechanism housing contains a feed cam and attached feed finger which operate to engage the clip strip and move it forwardly toward the drive track. The feed cam and feed finger are actuated by the driver tip during each actuation of the tool. A spring biased back stop engages the clip strip after each advancement, assuring that the clip strip will not shift rearwardly away from the drive track. The bottom end of the guide body may be provided with a clip support assembly for supporting each clip within the guide track, and particularly the last clip of a strip.

Finally, the tool is provided with a circular magazine capable of holding the clip strip in coiled form. The magazine is mounted on and supported by the tool, and is easily removed therefrom and replaced. The magazine can be made to be refillable and reusable or disposable, as desired.

DETAILED DESCRIPTION OF THE INVENTION

As indicated above, the basic driving tool of the present invention constitutes a conventional driving tool modified for the purposes of this invention. The driving tool may be of any appropriate type having a driver. While the driving tool may be of the multiple blow type, it is preferred that it be of the single blow type (i.e., a fastener driving tool of the type intended to drive a fastener home in a workpiece by a single blow of the driver). The tool may be of the electromechanical type, the fluid actuated type, or the like.

For purposes of an exemplary showing, the tool will be described in terms of a pneumatic fastener driving tool of the general type taught in U.S. Pat. No. 3,477,629.

Figure 1:
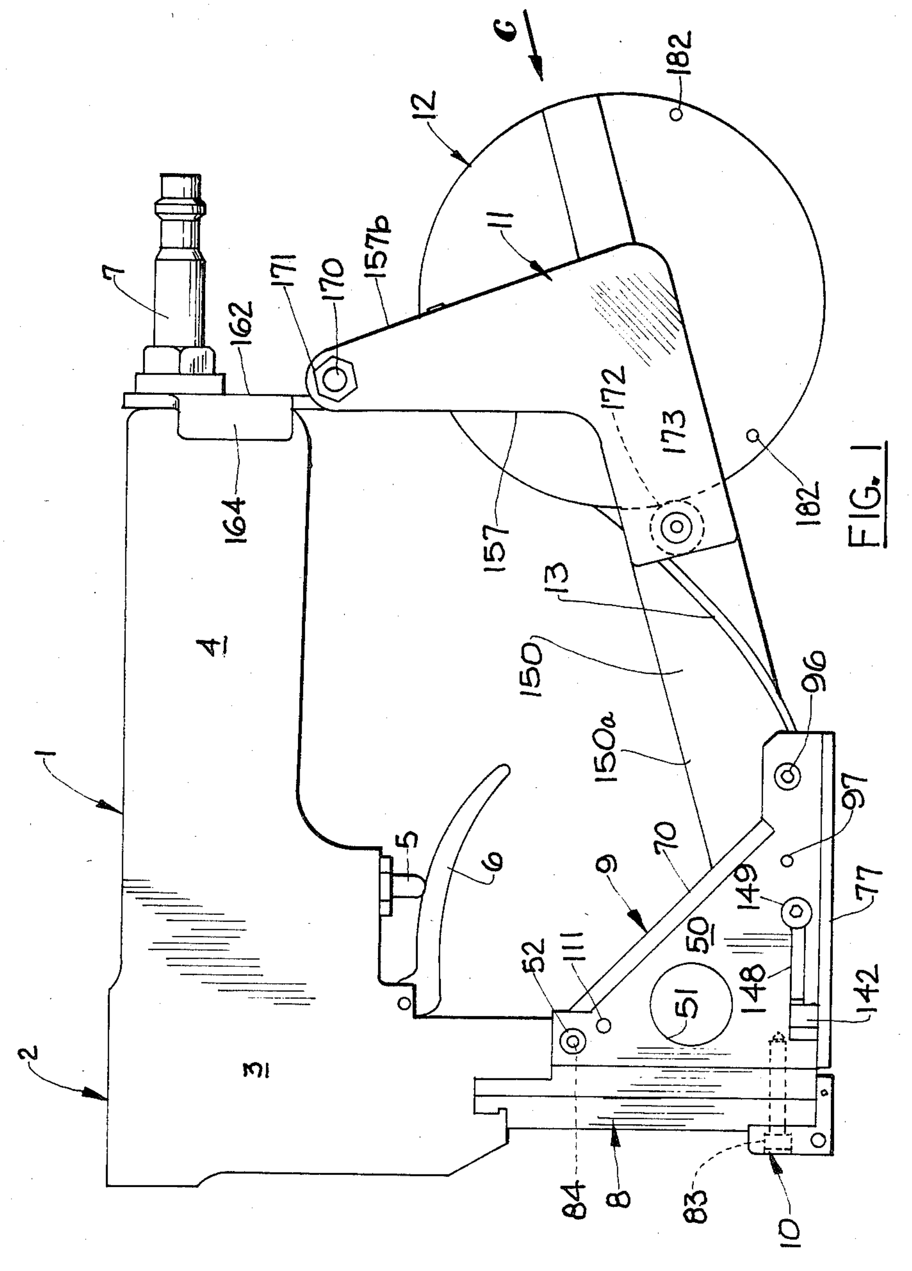
FIG. 1 is a side elevation of the tool and magazine of the present invention.

In all of the figures, like parts have been given like index numerals. Reference is first made to FIG. 1 wherein the tandem push-clip system of the present invention is illustrated. The overall system is generally indicated at 1. The fastener driving tool is generally indicated at 2, having a body portion 3 and a handle portion 4. In the particular tool 2 illustrated, the body portion 3 contains a cylinder (not shown) having a piston/driver assembly (not shown) together with an actuating valve (not shown) at the upper end of the cylinder and a remote trigger valve for operating the actuating valve. The actuator of the remote valve is shown at 5 and is operated by a manual trigger 6. At the rearward end of handle 4, the tool 2 is provided with a fitting 7 by which it can be connected to a source (not shown) of air under pressure.

A guide body is generally indicated at 8 and is mounted on the lower portion of tool body 3. As will be shown and described hereinafter, the guide body provides a drive track for the driver of the piston/driver assembly and the driver tip. Mounted on guide body 8, there is a clip feed mechanism, generally indicated at 9, and a clip support assembly, generally indicated at 10. A magazine support assembly is generally indicated at 11, mounted on handle 4 at one end and on the clip feed mechanism 9 at the other. The magazine support assembly removably mounts a magazine, generally indicated at 12, provided with an elongated strip 13 of push-on clips.

Figure 39:
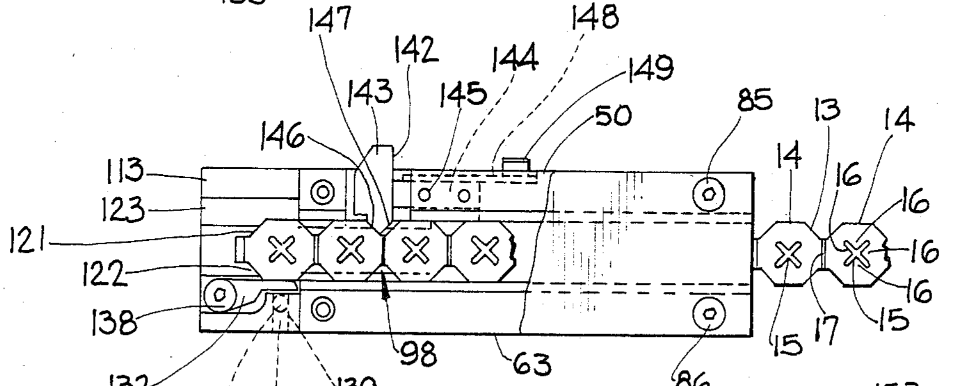
FIG. 39 is a fragmentary bottom view of the clip feed mechanism, the guide body and the clip support assembly with the bottom plate partially broken away.

Reference is now made to FIG. 39 wherein the clip strip 13 is more clearly shown. While not intended to be a limitation on the present invention, the peripheral configuration of each clip 14 of strip 13 is illustrated as being octagonal. Each clip 14 is slightly domed and provided with a central perforation 15 of X-shaped configuration. The X-shaped perforation 15 of each clip defines four distortable, substantially triangular lobes 16, as described above. The strip 13 is formed as an integral, one-piece structure wherein each clip 14 constitutes an integral part of the next adjacent clip 14. A transverse notch or line of weakening 17 is provided between each adjacent clip, so that each clip can be easily severed from strip 13.

Figure 2:
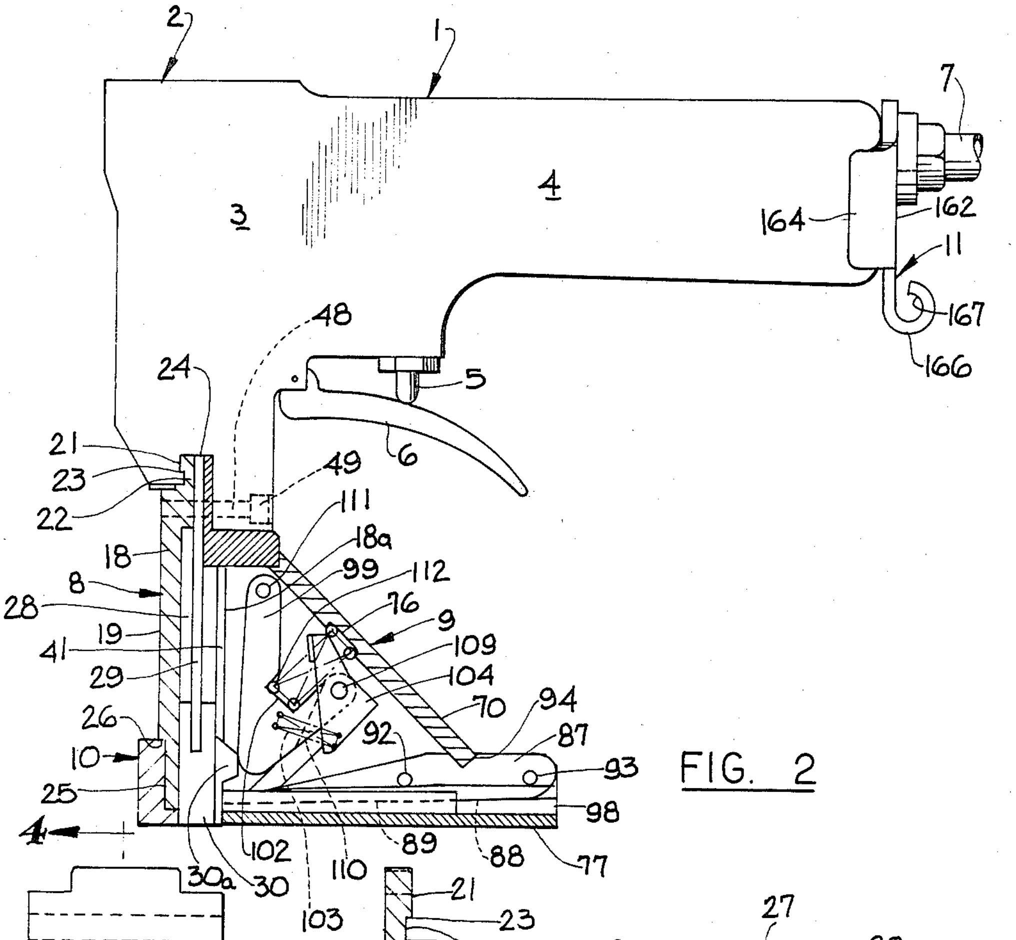
FIG. 2 is a simplified side elevational view of the tool with the guide body and clip feed mechanism in cross section.

Reference is now made to FIGS. 2–9. FIG. 2 is similar to FIG. 1, with magazine 12 and the majority of the magazine support assembly 11 removed, for purposes of clarity.

Figure 3:
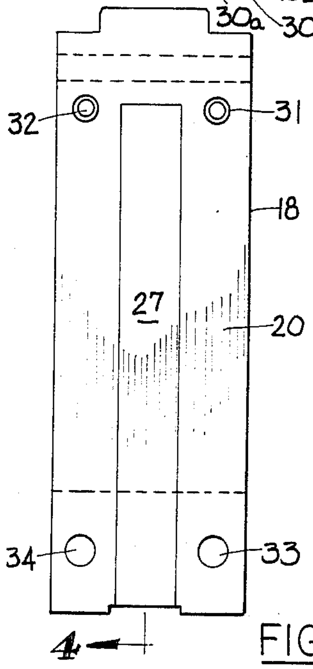
FIG. 3 is a rear elevational view of the guide body front plate.
Figure 4:
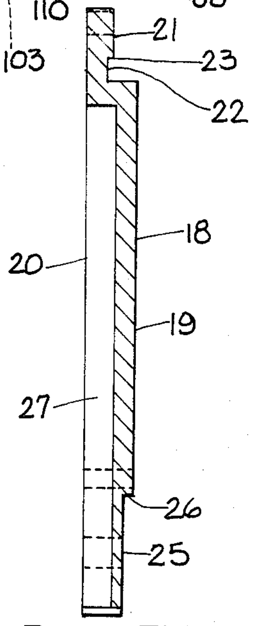
FIG. 4 is a cross-sectional view taken along section line 4—4 of FIG. 3.
Figure 5:
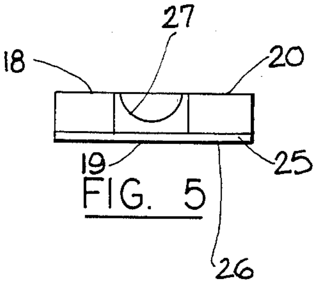
FIG. 5 is a bottom view of the front plate of FIG. 3.
Figure 10:
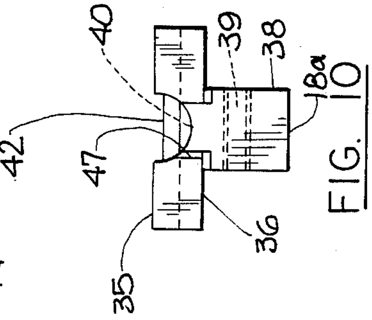
FIG. 10 a bottom view of the rear plate of FIG. 6.
Figure 8:
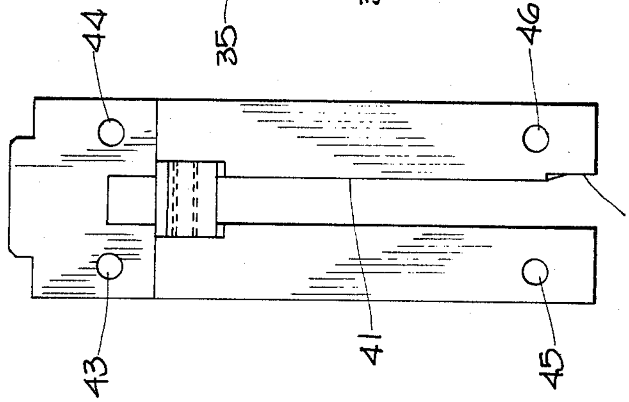
FIG. 8 is a rear elevational view of the rear plate of FIG. 6.
Figure 7:
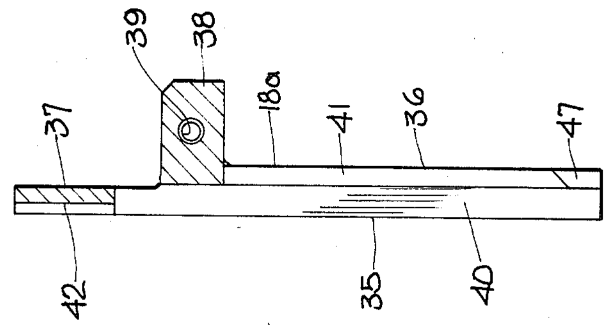
FIG. 7 is a cross-sectional view taken along section line 7—7 of FIG. 6.
Figure 9:
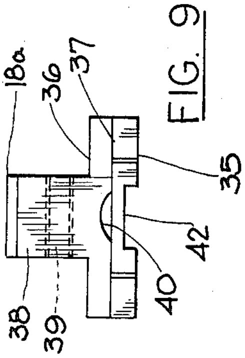
FIG. 9 is a plan view of the rear plate of FIG. 6.
Figure 6:
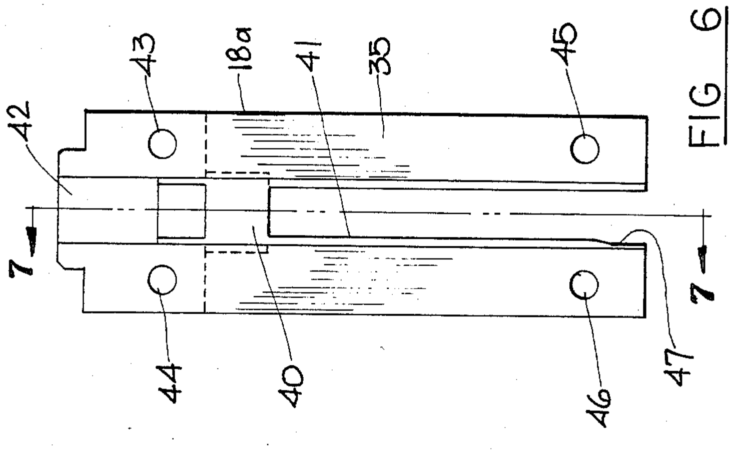
FIG. 6 is a front elevational view of the rear plate of the guide body.

As can be determined from FIG. 2, the guide body 8 is made up of two parts, a front plate 18 and a rear plate 18*a*. The front plate is illustrated in FIGS. 3, 4 and 5.

Front plate 18 has a substantially planar front surface 19 and a substantially planar rear surface 20. Front surface 19 is inset as at 21 and notched, as at 22 to form a shoulder 23. The configuration is adapted to conform to and to cooperate with a similarly configured notch 24 formed at the bottom end of tool body 3. At its lower end, the front surface 19 of front plate 18 is inset as at 25, forming a shoulder 26. The surface 25 and shoulder 26 are adapted to receive a portion of the clip support assembly 10, as shown in FIG. 2. As can be ascertained from all three of FIGS. 3, 4 and 5, the rearward surface 20 of front plate 18 is provided with a semi-circular, longitudinal groove 27 constituting a part of drive track 28 (see FIG. 2) accommodating driver 29 and its tip 30. Front plate 18 is provided with an upper pair of perforations 31 and 32, and a lower pair of threaded perforations 33 and 34, the purpose of which will be apparent hereinafter.

The rear plate 18*a* of guide body 8 is illustrated in FIGS. 6–10. Rear guide body plate 18*a* has a substantially planar front surface 35 and a substantially planar rear surface 36. The upper part of the rear surface is inset, as at 37. The rear surface 36 is also provided with a rearward extension 38, the purpose of which will be apparent hereinafter. The rearward extension 38 has a transverse threaded bore 39.

In its forward face 35, the rear plate 18*a* is provided with a semi-circular, longitudinally extending groove 40 similar to and complimentary to the groove 27 of front plate 18. The groove 40 extends to a position above extension 38. The rear plate 18*a* is also provided with a longitudinal slot 41 which is coextensive with groove 40. The purpose of slot 41 will be apparent hereinafter. The forward surface 35 of rear plate 18*a* is, at its upper portion, provided with a longitudinal slot 42 of rectangular configuration, again the purpose of which will be apparent hereinafter. To complete this structure, the rear plate 18*a* is provided with a pair of upper perforations 43 and 44 and a pair of lower perforations 45 and 46, the purpose of which will be apparent hereinafter. One side of slot 41 is relieved as at 47 to accommodate the nose portion of the feed finger, as will be apparent hereinafter.

The rearward surface 20 of front plate 18 abuts the forward surface 35 of rear plate 18*a*, forming the complete guide body 8. When this is the case, the perforations 31, 32, 33 and 34 of front plate 18 are coaxial with the perforations 43, 44, 45 and 46, respectively, of rear plate 18*a*. The lower end of body 3 is provided with a pair of perforations coaxial with front and rear plate perforations 31/43 and 32/44. A pair of machine screws pass through the lower end of body 3 and through the perforations 43 and 44 of rear plate 18*a*, being threadedly engaged in perforations 31 and 32 of front plate 18, whereby the guide body 8 is affixed to tool body 3. One such perforation at the lower end of tool body 3 is shown in FIG. 2 in broken lines at 48, together with one of the bolts indicated at 49. When guide body 8 is assembled and mounted in place, the longitudinal semi-circular groove 27 of front plate 18 and the longitudinal semi-circular groove 40 of rear plate 18*a* cooperate to form a substantially cylindrical drive track slidably accommodating the substantially cylindrical body of the driver tip. The longitudinal slot 41 in rear plate 18*a* accommodates an extension 31*a* on driver tip 30. The substantially rectangular groove 42 of rear plate 18*a* slidably accommodates driver 29, which is of rectangular cross section.

Figure 12:
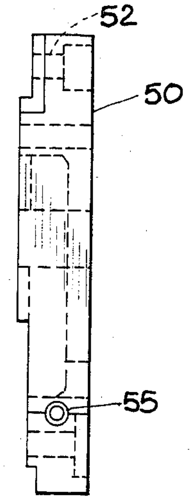
FIG. 12 is a front elevational view of the left side plate.
Figure 11:
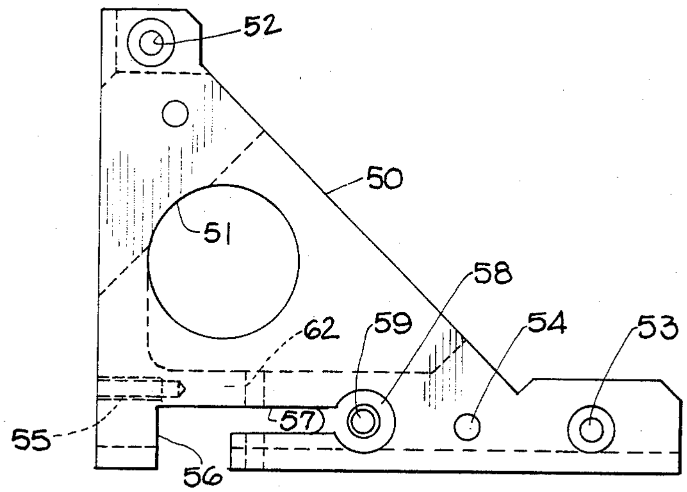
FIG. 11 is an elevational view of the left side plate of the clip feed mechanism.
Figure 13:
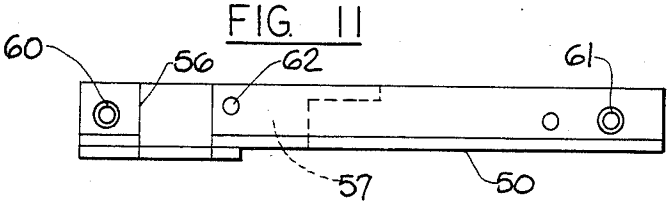
FIG. 13 is a bottom view of the left side plate.

As indicated above, the clip feed mechanism 9 is attached to guide body 8. The clip feed mechanism comprises a housing having a pair of side plates which are illustrated in FIGS. 11–16. The left side plate is shown in FIGS. 11–13 and is designated by index numeral 50. The left side plate 50 is substantially triangular in configuration and is provided with a central access port 51. At its upper end, left side plate 50 is provided with a perforation 52. Similarly, at its lower rearward end it is provided with perforations 53 and 54. A threaded perforation is provided in its forward face as at 55. At 56, the left side plate 50 is provided with a transverse slot, having an extension 57. The transverse slot portion 57 terminates in a depression 58 surrounding a threaded perforation 59. The purpose of these various perforations and slots will be apparent hereinafter. Finally, the bottom of left side plate 50 is provided with a pair of threaded perforations 60 and 61, together with a perforation 62 which intersects slot portion 57. The purpose of these perforations will also be apparent hereinafter.

Figure 14:
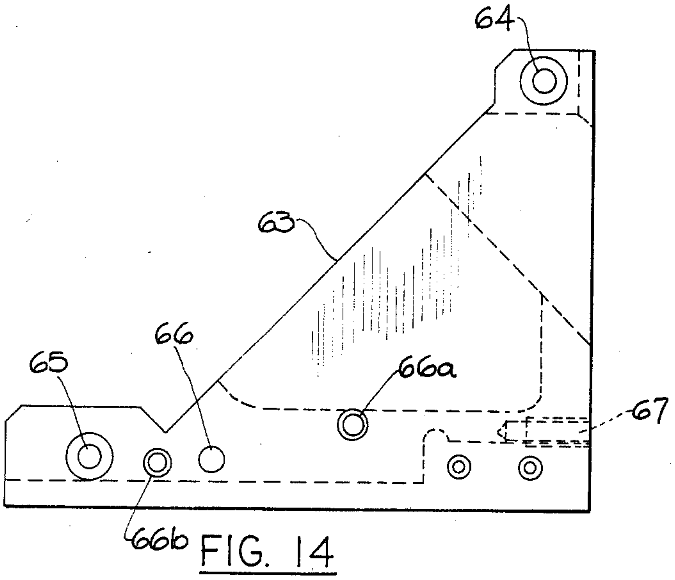
FIG. 14 is an elevational view of the right side plate of the clip feed mechanism.
Figure 15:
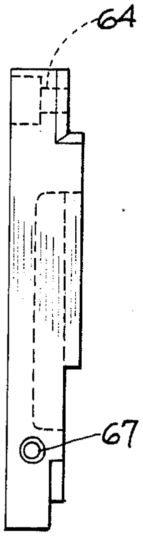
FIG. 15 is a front elevational view of the right side plate.
Figure 16:
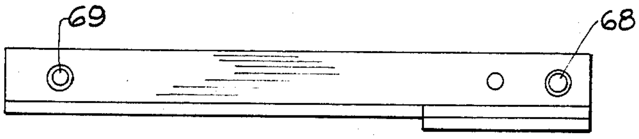
FIG. 16 is a bottom view of the right side plate.

The right side plate is illustrated in FIGS. 14–16 and is indicated by index numeral 63. The right side plate 63 is similar to left side plate 50, with the exception that it is not provided with an access port equivalent to access port 51 or a slot equivalent to slot 56/67 and its depression 58 surrounding a perforation 59. The right side plate 63 has a perforation 64 equivalent to perforation 52 of the left side plate. Similarly, the right side plate has perforations 65, 66, 67, 68 and 69 equivalent to perforations 53, 54, 55, 60 and 61, respectively, of left side plate 50. It is further provided with perforations 66*a* and 66*b*.

Figure 17:
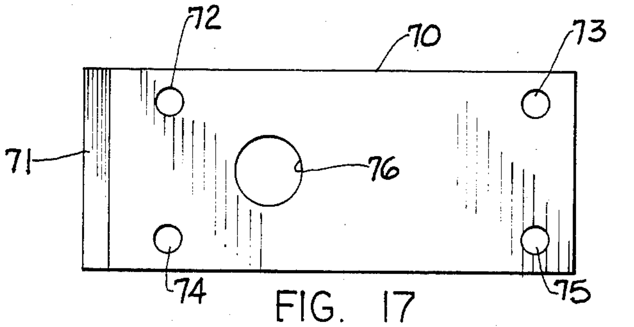
FIG. 17 is a bottom view of the cover plate of the clip feed mechanism.
Figure 18:
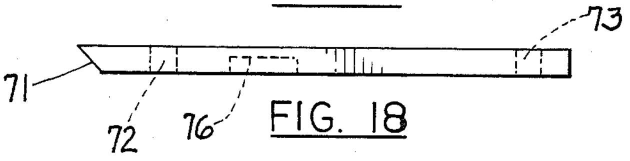
FIG. 18 is a side elevational view of the cover plate.

The clip feed mechanism housing has a cover plate illustrated in FIGS. 17 and 18 at 70. The cover plate comprises a rectangular, planar plate having a sloped forward edge 71, four perforations 72–75 and a central circular depression 76. The purpose of these perforations and the depression will be apparent hereinafter.

Figure 19:
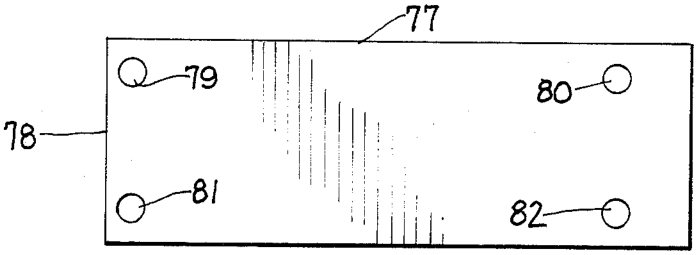
FIG. 19 is a bottom view of the bottom plate of the clip feed mechanism.

Finally, the clip feed mechanism housing is completed by a bottom plate, indicated at 77 in FIG. 19. The bottom plate is a rectangular, planar plate having a forward edge 78 and four perforations 79–82.

Reference is made to FIGS. 1 and 2, as well as FIGS. 11–16. The left side plate 50 is attached to the guide body 8 by means of a machine screw (shown at 83 in FIG. 1) which passes through a perforation in the clip support assembly 10 to be described hereinafter, as well as through the perforation 34 of guide body front plate 8, the perforation 45 of guide body rear plate 18*a* and into the threaded perforation 55 of the left side plate. The upper end of the left side plate is attached to the guide body rear plate extension 38 by means of a machine screw 84 (see FIG. 1) passing through the perforation 52 of left side plate 50 and into the threaded perforation 39 of the guide body rear plate extension 38. It will be understood that the right side plate 63 is attached to the guide body 8 in precisely the same manner utilizing perforations 64 and 67 of right side plate 63.

As is shown in FIGS. 1 and 2, the cover plate 70 is mounted on the sloping edges of side plates 50 and 63 using machine screws (not shown) passing through the cover plate perforations 72–75 and into corresponding threaded perforations (not shown) in the sloped edges of side plates 50 and 63.

Bottom plate 77 is affixed to the bottom edges of side plates 50 and 63. To this end, machine screws pass through perforations 79 and 80 in the bottom plate and are threadedly engaged in perforations 60 and 61, respectively of left side plate 50. Similarly, machine screws pass through bottom plate perforations 81 and 82 and are threadedly engaged in right side plate perforations 68 and 69, respectively. Two machine screws attaching bottom plate 77 to side plates 50 and 63 are shown at 85 and 86 in FIG. 39.

Figure 22:
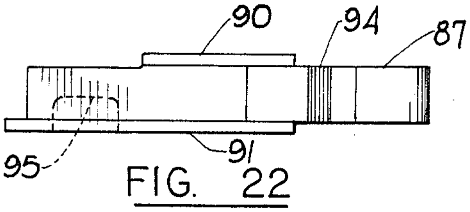
FIG. 22 is a plan view of the clip strip guide.
Figure 20:
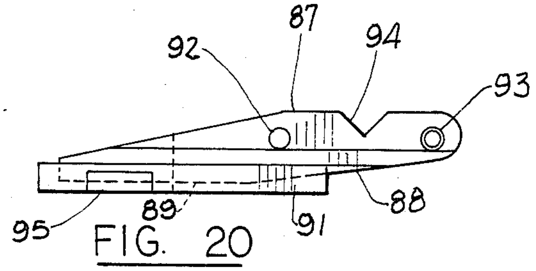
FIG. 20 is a side elevational view of the clip strip guide.
Figure 21:
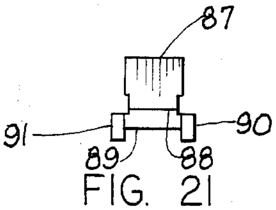
FIG. 21 is an end elevational view of the clip strip guide of FIG. 20, as seen from the right of that Figure.

Mounted within the clip feed mechanism housing there is a clip strip guide illustrated in FIGS. 20–22, and indicated by index numeral 87. As will be most clearly seen in FIG. 20, the bottom surface of clip strip guide 87 has a downwardly and forwardly sloping portion 88 and a horizontal portion 89 (as viewed in FIG. 20). The clip strip guide is provided with a pair of downwardly depending flanges 90 and 91 which, in combination with bottom surfaces 88 and 89 define a channel for the clip strip 13 to pass through. The clip strip guide is provided with a transverse perforation 92, and a threaded transverse perforation 93. The upper surface of the clip strip guide is notched as at 94 to accommodate the rearward end of cover plate 70, when the clip strip guide is mounted in place. Finally, the clip strip guide is provided with a notch 95 which accommodates the back stop, to be described hereinafter.

FIG. 2 illustrates the clip strip guide 87 mounted within the housing of the clip feed mechanism 9. The clip strip guide 87 is attached to and between side plates 50 and 63 by means of machine screws passing through the side plate perforations 53 and 65 and threadedly engaged in the clip strip guide perforation 93, together with a pin 97 which passes through left side plate perforation 54, clip strip guide perforation 92 and right side plate perforation 66. One of the above noted machine screws is illustrated at 96 in FIG. 1 and the pin is illustrated at 97 in FIG. 1. As is most clearly shown in FIG. 2, the bottom edge of clip strip guide flange 91 rests upon bottom plate 77. The same is true of clip strip guide flange 90. Thus, the flanges 90 and 91, together with clip strip bottom surfaces 88 and 89 and the top surface of bottom plate 77 define a channel, generally indicated at 98, through which the clip strip passes, so that the forwardmost clip of the strip is properly directed to drive track 28.

Figure 23:
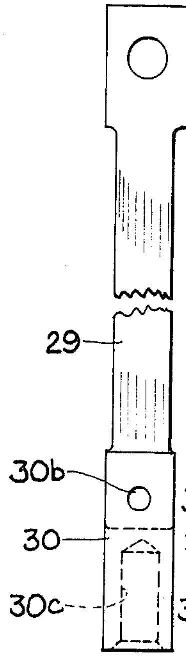
FIG. 23 is a fragmentary elevational view of the driver and its tip.
Figure 24:
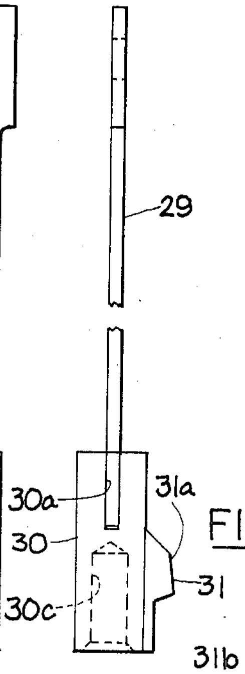
FIG. 24 is a fragmentary side elevational view of the driver and its tip.
Figure 25:
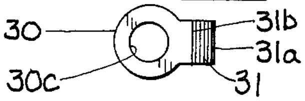
FIG. 25 is a bottom view of the driver tip.

The driver 29 and its modified tip 30 are illustrated in FIGS. 23–25. As indicated above, the driver 29 constitutes an elongated metallic member of rectangular cross section. The driver tip 30 comprises a cylindrical body having a slot 30*a* adapted to receive the lower end of driver 29. The tip 30 is affixed to driver 29 by means of a pin 30*b*. The tip 30 has an axial bore 30*c* which opens at the bottom of the tip 30. The bore 30*c* is of a diameter greater than the posts on which the clips are mounted and less than the transverse dimension of the clips. As a consequence, the bore 30*c* can accommodate a workpiece post as the driver 29 and tip 30 apply a clip thereto.

On its peripheral surface, the driver tip 30 has an integral lug 31. The lug 31 provides a cam surface 31*a*. At its bottom, the lug 31 provides a cutting edge 31*b* by which the forwardmost clip of the strip is severed from the next adjacent clip during the clip-applying operation. The lug 31 is of a width to extend through and be slidable in the slot 41 of rear guide body plate 18*a*, as is clearly shown in FIG. 2.

Figure 27:
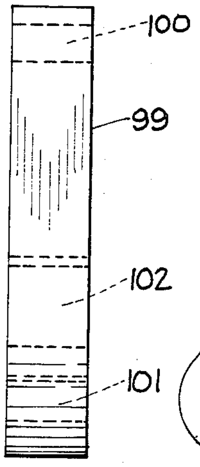
FIG. 27 is a front elevational view of the feed cam as seen from the left of FIG. 26.
Figure 26:
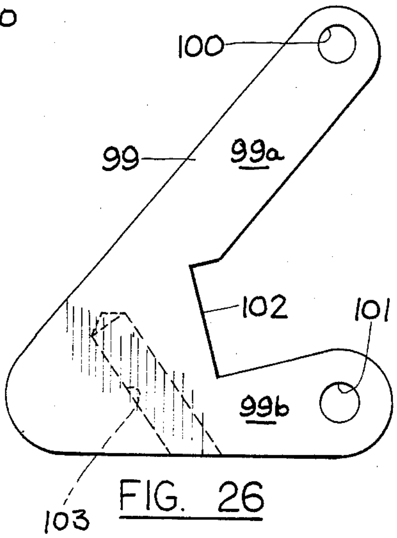
FIG. 26 is a side elevational view of the feed cam.

In FIGS. 26 and 27, a feed cam 99 is illustrated. The feed cam 99 is essentially V-shaped, having a perforation 100 at the end of its upper leg 99*a* and a perforation 101 at the end of its lower leg 99*b*. At the juncture of legs 99*a* and 99*b*, a flat surface 102 is formed, constituting a spring seat, as will be apparent hereinafter. Finally, the feed cam 99 is provided with a bore 103, the purpose of which will be apparent hereinafter.

Figure 29:
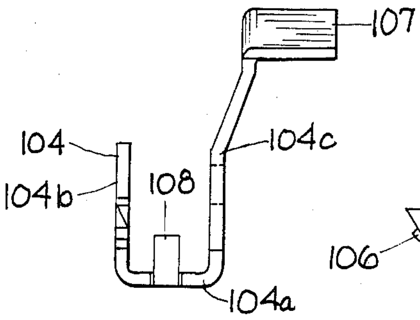
FIG. 29 is a front view of the feed finger as seen from the left of FIG. 28.
Figure 28:
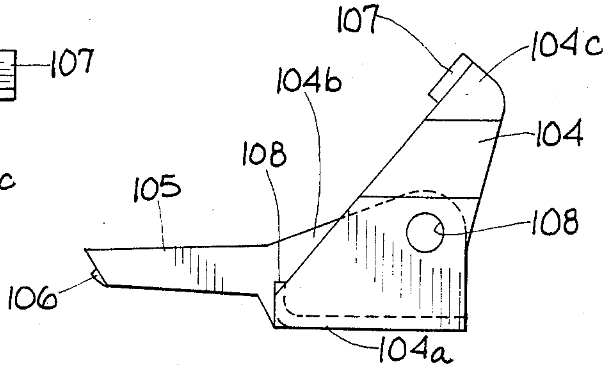
FIG. 28 is a side elevational view of the feed finger.

A feed finger 104 is illustrated in FIGS. 28 and 29. The feed finger 104 comprises a U-shaped member having a base portion 104*a*, and a pair of upstanding legs 104*b* and 104*c*. The leg 104*b* has an extension 105 mounted thereon and provided with a clip engaging tip 106. The leg 104*c* extends above leg 104*b* and terminates in a laterally extending handle 107. The forwardmost end of the base portion 104*a* is provided with an upturned tine 108. Finally, the leg 104*c* is provided with a perforation 108. It will be understood that the leg 104*b* is provided with a coaxial perforation (not shown).

Reference is now made to FIGS. 2 and 26–29. As is clearly shown in FIG. 2, the leg 99*b* of feed cam 99 is adapted to lie between the legs 104*b* and 104*c* of feed finger 104 and these elements are pivoted together by a pin 109 (see FIG. 2) which passes through the perforation 101 of the feed cam and the perforation 108 of feed finger leg 104*c* and the coaxial perforation (not shown) in feed finger leg 104*b*.

As is further shown in FIG. 2, the bore 103 of feed cam 99 houses a compression spring 110. The upper end of compression spring 110 abuts the end of bore 103. The lower end of compression spring 110 abuts the base portion 104*a* of feed finger 104 and is kept on base portion 104*a* by upstanding tine 108. The compression spring 110 urges the feed finger in a counterclockwise direction about pivot pin 109, as viewed in FIG. 2, thus urging the feed finger extension 105 and its clip engaging tip 106 downwardly, as viewed in FIG. 2. The upper leg 99*a* of feed cam 99 is pivotally mounted within the housing of the clip feed mechanism 9 by a pivot pin 111 passing through the perforation 100 in feed cam leg 99*a*. The ends of pin 111 are mounted in perforations in clip feed mechanism side plates 50 and 63. As a consequence, the end of pin 111 is visible in FIG. 1. A compression spring 112 is provided. One end of compression spring 112 abuts the surface 102 of feed cam 99. The other end of compression spring 112 extends into the circular depression 76 of cover plate 70. The compression spring 112 urges the feed cam in a clockwise direction about the pin 111, as viewed in FIG. 2.

The clip support assembly is shown generally at 10 in FIGS. 1 and 2. While this assembly is optional, its presence is preferred because it offers better support for the forwardmost clip of the clip strip 13, and will provide full support for the last clip of strip 13. In the absence of the clip support assembly 10, the last clip would be unusable since it would fall out of the bottom of guide body 8, there being no more strip to support it within drive track 28.

Figure 32:
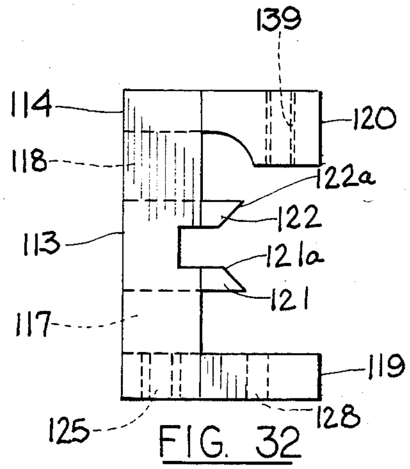
FIG. 32 is a plan view of the clip support assembly frame.
Figure 33:
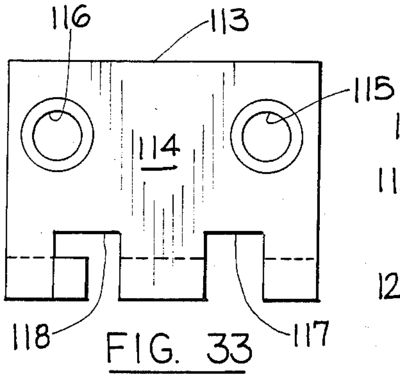
FIG. 33 is a front view of the clip support assembly frame.
Figure 31:
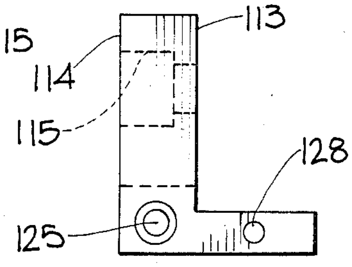
FIG. 31 is a left side elevational view of the clip support assembly frame.

The clip support assembly comprises a clip support assembly frame, a stationary clip support and a shiftable clip support. The clip support assembly frame is illustrated in FIGS. 30–33 and is generally indicated by index numeral 113. As will be apparent from FIG. 31, the clip support assembly frame 113 is L-shaped in side elevation. Its upstanding leg 114 is provided with a pair of perforations 115 and 116 by which it is attached to guide body 8. As indicated above, and as shown in FIG. 1, a machihe screw 83 passes through the perforation 115 of the clip support assembly frame 113, the perforation 34 of the guide body front plate 18, the perforation 45 of the guide body rear plate 18*a* , and into the threaded perforation 55 of left side plate 50. In similar fashion, a machine screw (not shown) passes through the clip support assembly frame perforation 116, the perforations 34 and 46 in the guide body front and rear plates 18 and 18*a*, and into the threaded perforation 67 of right side plate 63. The vertical leg 114 of FIGS. 31 and 33 is notched as at 117 and 118. The lower or horizontal leg of the L-shaped clip support assembly frame (as viewed in FIG. 31) is made up of four extensions 119–122, as can best be ascertained from FIGS. 30 and 32. Extensions 121 and 122 have inwardly and forwardly sloping surfaces 121*a* and 122*a*, respectively, which are adapted to serve as forward abutments or stop gauges for the forwardmost clip of the strip when properly located in drive track 28. This is clearly shown in FIG. 39.

Figure 35:
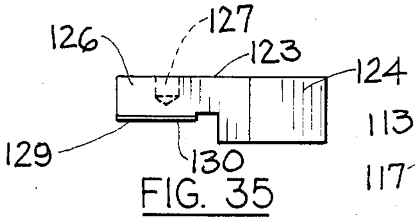
FIG. 35 is a plan view of the stationary clip support of FIG. 34.
Figure 36:
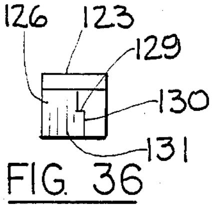
FIG. 36 is an end elevational view of the stationary clip support as seen from the left of FIG. 34.
Figure 34:
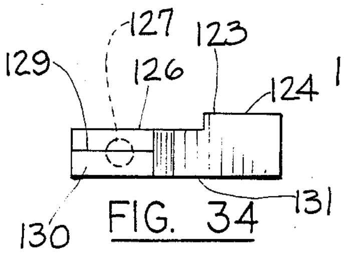
FIG. 34 is a side elevational view of the stationary clip support.

The notch 117 of clip support assembly frame 113 is adapted to receive a stationary clip support illustrated in FIGS. 34–36 and indicated by index numeral 123. The stationary clip support has a forward body portion 124 adapted to be received in notch 117 and held in place therein by a set screw (not shown) threadedly engaged in the perforation 125 in the clip support assembly frame (see FIG. 31). The stationary clip support 123 has a narrower rearward portion 126, having a socket 127 therein for receipt of a pin (not shown) passing through the perforation 128 in the clip support assembly frame 113 (see FIG. 31). As is most clearly shown in FIG. 36, the rearward portion 126 of stationary clip support 123 has a narrow shoulder 129 formed thereon and intended to support one side edge of the forwardmost clip of the strip. The shoulder or ledge 129 is of a width of about 0.010 inch. The surface 130 leading from shoulder 129 to the bottom surface 131 of stationary clip support 123 slopes downwardly and to the right as viewed in FIG. 36 at about 2°.

The function of stationary clip support 123 is to support one side of that clip located in drive track 28. The stationary clip support 123 is preferably made as a separate element so that it can be replaced, if need be, by virtue of wear of the narrow shoulder or ledge 129.

Figure 38:
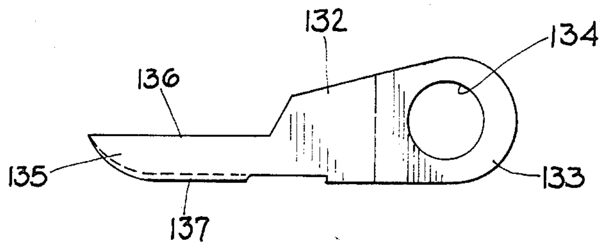
FIG. 38 is a top view of the shiftable clip support.
Figure 37:
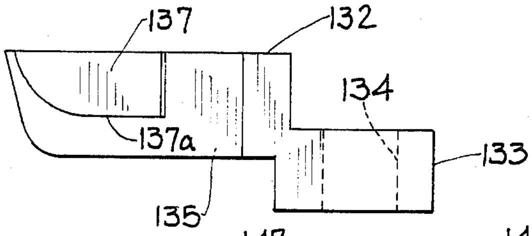
FIG. 37 is a side elevational view of the shiftable clip support.

A shiftable clip support is illustrated in FIGS. 37 and 38, and is indicated by index numeral 132. The shiftable clip support 132 has a forward portion 133 having a perforation 134 therein. The shiftable clip support 132 has a rearward portion 135, one side of which is planar, as at 136. The other side of the shiftable clip support forward portion 35 has a raised element 137 formed thereon. The upper edge 137*a* of raised portion 137 is slightly rounded. As can be seen in the plan view of FIG. 38, the raised portion 137 is quite thin, of the order of 0.010 inch.

Figure 30:
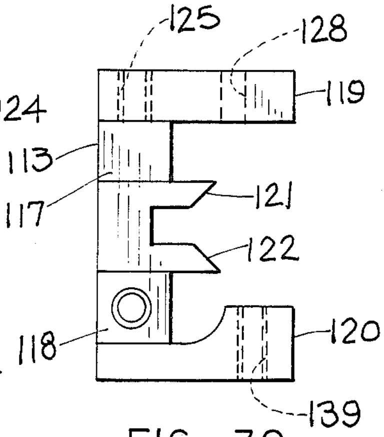
FIG. 30 is a bottom view of the clip support assembly frame.

The forward portion 133 of shiftable clip support 132 is adapted to be pivotally mounted in the notch 118 of clip support assembly frame 113 (see FIGS. 30, 32, 33 and 39) by a machine screw 138 (see FIG. 39). As is shown in FIGS. 30 and 32, the clip support assembly frame 113 has a threaded perforation 139 formed therein. Referring to FIG. 39, the threaded perforation 139 is adapted to receive a set screw 140 which serves as a seat for a compression spring 141. The other end of compression spring 141 abuts the planar surface 136 of the shiftable clip support 132. Thus, compression spring 141 urges the shiftable clip support 132 in a counterclockwise direction as viewed in FIG. 39, engaging the sides of that clip in the guide track 28 between the stationary clip support 123 and the shiftable clip support 132 as is shown in FIG. 39. It will be apparent from FIG. 39 that all of the clips of clip strip 13, except the last clip of the strip, will not only be supported by stationary clip support 123 and shiftable clip support 132, but also by the adjacent clip to which it is attached, and which is located in the clip strip channel 98 (see FIGS. 2 and 39). The last clip of the strip, however, will be supported only by the stationary clip support 123 and the shiftable clip support 132, as will be evident to one skilled in the art.

To prevent the clip strip 13 from inadvertent rearward shifting, the tool of the present invention is provided with a backstop element. The backstop element is illustrated at 142 in FIGS. 1 and 39. The backstop element 142 comprises a head 143 and a shank 144. The head is located in the notch 95 of clip strip guide 87 and in the notch 56 of the left side plate 50 (see FIG. 11) with the shank 144 located in the notch extension 57. The backstop element 143 is pivotally mounted by a pin 145 located in the bore 62 of the left side plate 50 (see FIG. 11) and passing through a corresponding hole in the backstop element shank 144. The backstop element 142 has a nose portion providing cam surfaces 146 and 147. When the backstop element 142 is in the position shown in FIG. 39, the cam surface 146 engages the second clip of the strip 13 and prevents rearward movement thereof (to the right as viewed in FIG. 39). The cam surface 147 enables the next clip to shift the backstop element 142 out of the way when the clip strip is advanced (to the left in FIG. 39) until the backstop returns to the position shown in FIG. 39, again engaging the second clip of strip 13. The backstop element 142 is urged to the position shown in FIG. 39 by a leaf spring 148 located in the depression 58 (see FIG. 11) of left side plate 50 and extending along the shank 144 of the backstop element 142. The leaf spring 148 is held in place by a machine screw 149 (FIG. 1) which passes through a perforation in leaf spring 148 and is threadedly engaged in the perforation 59 of left side plate 50 (see FIG. 11). The head 143 of backstop element 142 extends beyond the confines of left side plate 50 so that it can be manually engaged by the operator and shifted to its release position, against the action of spring 148, should it be desired to remove a clip strip from the tool.

At this point, the magazine support assembly will be described. The magazine support assembly comprises a right side bracket illustrated in FIGS. 40 and 41, and left side bracket illustrated in FIGS. 42 and 43, and an attachment bracket illustrated in FIGS. 44 and 45.

Figure 40:
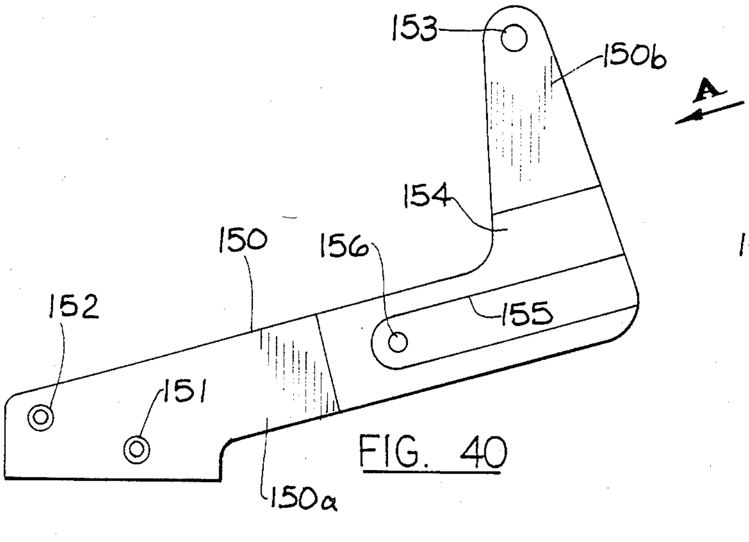
FIG. 40 is a side elevational view of the right side bracket of the magazine support assembly.
Figure 41:
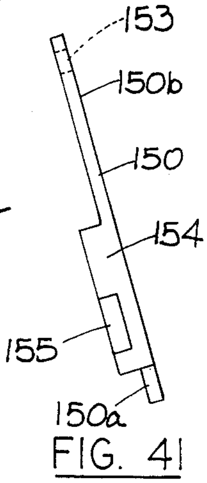
FIG. 41 is on auxiliary end elevation of the right side bracket of FIG. 40, as viewed along arrow A of FIG. 40.

Turning first to FIGS. 40 and 41, the right side bracket is indicated by index numeral 150. As will be apparent from FIG. 40, the right side bracket 150 is L-shaped, having a leg 150*a* and a leg 150*b*. The end of leg 150*a* is provided with a pair of perforations 151 and 152 which correspond to threaded perforations 66*a* and 66*b* of right side plate 63 (see FIG. 14). Thus, as is apparent from FIG. 1, the right side bracket leg 150*a* is adapted to be affixed to the right side plate 63 by a pair of machine screws (not shown) passing through bracket perforations 151 and 152 and threadedly engaging in right side plate perforations 66*a* and 66*b*. The end of leg 150*b* has a perforation 153, the purpose of which will be apparent hereinafter. The bracket 150 has a central portion 154, at the juncture of legs 150*a* and 150*b*, which is of greater thickness and which contains a longitudinal slot 155. At the forwardmost end of slot 155, the right side bracket 150 is provided with a perforation 156, the purpose of which will be apparent hereinafter.

Figure 43:
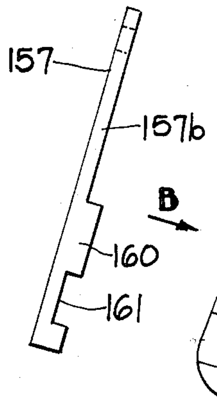
FIG. 43 is an auxiliary end elevational view of the left side bracket as viewed along arrow B of FIG. 42.
Figure 42:
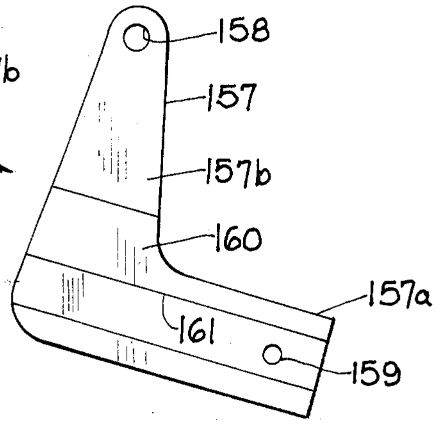
FIG. 42 is a side elevational view of the left side bracket of the magazine support assembly.

The left side bracket of the magazine support assembly is indicated at 157 in FIGS. 42 and 43. It will be apparent that the left side bracket 157 is substantially a mirror image of the right side bracket 150, with the exception that its leg **157*a* is shorter than right side bracket leg 150*a*. Left side bracket 157 is otherwise identical to right side bracket 150, having a perforation 158 equivalent to right side bracket perforation 153 and a perforation 159 equivalent to right side bracket perforation 156. The left side bracket 157 has a portion 160 of greater thickness, equivalent to right side bracket portion 154, and provided with a slot 161 equivalent to slot 155**.

Figure 45:
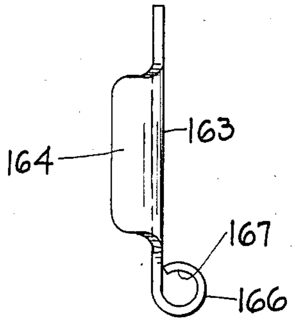
FIG. 45 is a side elevation of the attachment bracket as seen from the left of FIG. 44.
Figure 44:
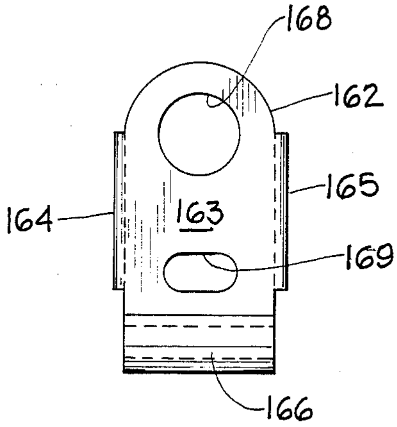
FIG. 44 is a rear view of the attachment bracket of the magazine support assembly.

The attachment bracket of the magazine support assembly 11 is indicated by index numeral 162 in FIGS. 44 and 45. The bracket 162 has a planar body 163 formed by integral, forwardly extending flanges 164 and 165. The bottom end of planar body portion 163 is curled into a tubular configuration 166 defining a transverse opening 167. The planar body portion 163 is provided with a perforation 168 and an access port 169. As will be apparent from FIGS. 1 and 2, the attachment bracket 162 is affixed to the rearward end of tool handle 4 by fitting 7, which extends through the attachment bracket perforation 168 and is threadedly engaged in handle 4. Proper orientation of the attachment bracket is assured by flanges 164 and 165 which flank the rearward end of handle 4.

Figure 50:
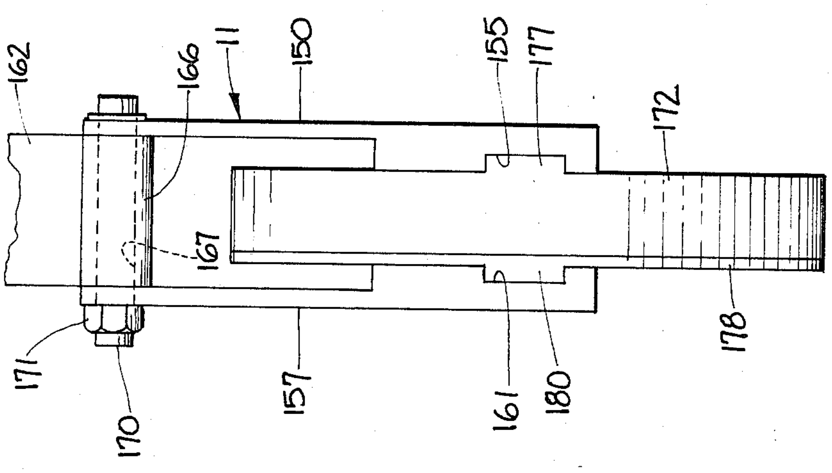
FIG. 50 is a fragmentary auxiliary end elevation of the magazine support assembly with the magazine mounted therein, as viewed along arrow C of FIG. 1.
Figure 49:
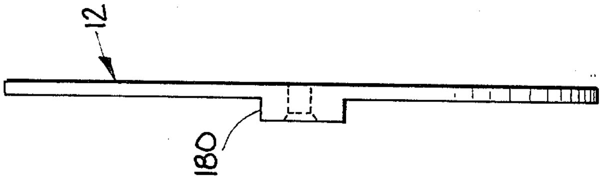
FIG. 49 is an end elevation of the magazine closure as seen from the right of FIG. 48.
Figure 48:
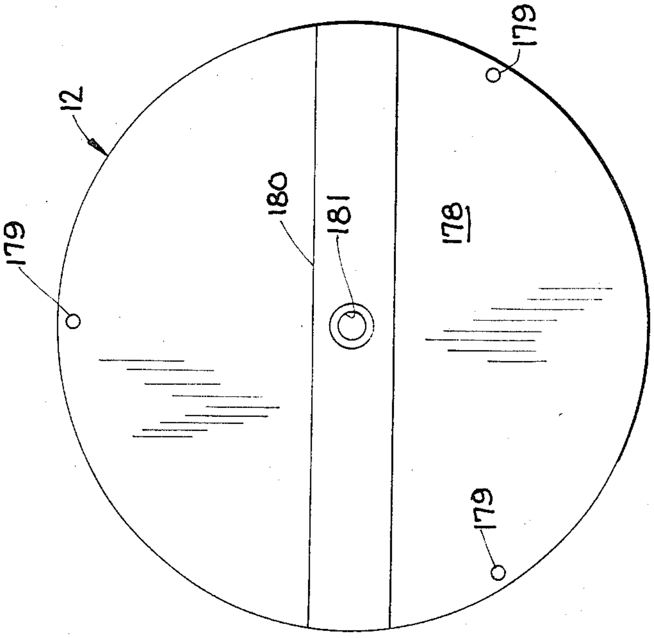
FIG. 48 is an elevational view of the magazine closure.

The end of leg **150*b* of right side bracket 150 and the end of leg 157*b* of left side bracket 157 are affixed to the tubular portion 166 of attachment bracket 162 by a bolt 170 passing through right side bracket perforation 153, transverse opening 167 of attachment bracket 162 and perforation 158 of left side bracket 157. The bolt 170 is shown in FIGS. 1 and 50, provided with a nut 171**.

The right side bracket 150 and left side bracket 157 are joined together and held together in parallel-spaced relationship by a cylindrical spacer 172 (see FIG. 1) having an axial threaded bore (not shown). A machine screw 173 passes through the perforation 159 in left side bracket 157 and is threadedly engaged in the spacer 172. A second machine screw (not shown) similarly passes through the right side bracket perforation 156 and is threadedly engaged in the threaded bore of spacer 172. As can be seen from FIG. 50, when the magazine support assembly 11 is fully assembled, the slot 155 of right side bracket 150 and the slot 161 of left side bracket 157 are in parallel-spaced relationship.

Figure 47:
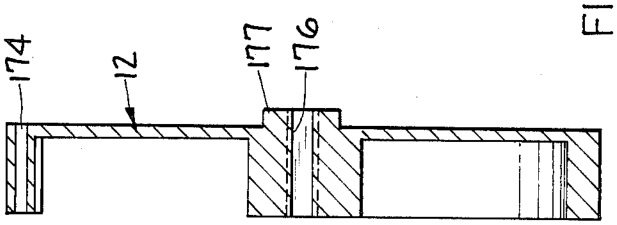
FIG. 47 is a cross sectional view taken along section line 47—47 of FIG. 46.
Figure 46:
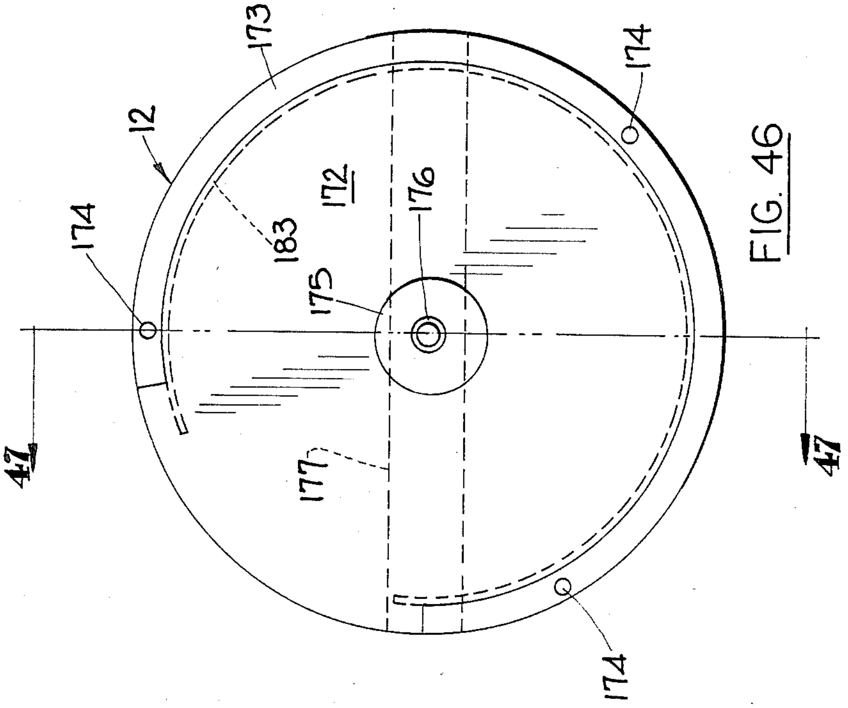
FIG. 46 is an elevational view of the magazine body.

The magazine 12 for clip strip 13 is illustrated in FIGS. 46–50. Reference is first made to FIGS. 46 and 47, wherein the magazine body is illustrated at 172. The magazine body 172 comprises a planar circular member having an annular wall 173 which extends slightly more than three-quarters of the way about the periphery. The annular wall is provided with three perforations 174, the purpose of which will be apparent hereinafter. The magazine body 172 is also provided with a central cylindrical hub 175 having a threaded axial bore 176. On its exterior surface, the magazine body is provided with a boss 177 extending diametrically thereacross.

The magazine also comprises a closure member 178 which is of substantially planar, circular configuration having a plurality of perforations 179, corresponding to the magazine body perforations 174. The closure 178 also has an exterior boss 180, equivalent to the magazine body boss 177, and extending diametrically across the exterior surface of the closure 178. Finally, the closure is provided with a central perforation 181, corresponding to central perforation 176 of the magazine body.

The closure member 178 is affixed to the annular wall 173 of magazine body 172 by a series of roll pins 182 (see FIG. 1) passing through the perforations 179 of closure 178 and perforations 174 of magazine body 172. In addition, a machine screw (not shown) passes through the closure perforation 181 and is threadedly engaged in the hub perforation 176 of magazine body 172. When the closure 178 is affixed to the magazine body 172, the bosses 177 and 180 are in aligned, parallel-spaced relationship.

FIGS. 1 and 50 illustrate the magazine 12 mounted in the magazine support assembly 11. When this is accomplished, the magazine boss 177 is slidably received in slot 155 of right side bracket 150 and the magazine boss 180 is received in the slot 161 of left side bracket 157. The bosses 177 and 180 fit within their slots 155 and 161 with a slight friction fit so that the magazine will remain in place during use, although it can be easily and quickly removed for replacement.

The magazine is filled by simply shoving a strip of clips thereinto through the opening in wall 173. The strip of clips will form a coil within the magazine. To make the coiling and uncoiling of a strip of clips into and from magazine 12 easier, a strip of nylon may be located within the magazine and along the inside surface of magazine wall 173. Such a strip is shown in broken lines 183 in FIG. 46.

The magazine 12 can be made of any appropriate material including metal. It can, of course, be a reusable and refillable magazine. On the other hand, however, the magazine lends itself well to being molded of a plastic material and, if desired, can be produced as a single-use, disposable magazine.

A tandem clip system of the present invention, having been described in detail, its operation can be set forth as follows: a cartridge 12 containing a strip 13 of tandem-type push-on clips is mounted to the magazine support assembly 11, as described above. The clip strip 13 is manually shoved into the space between clip strip guide 87 and bottom plate 77, defining clip strip channel 98. The strip 13 is shoved forwardly until the forwardmost clip of the strip enters and is properly located in drive track 28. The operator can readily ascertain visually when the forwardmost clip is properly placed, as is clear from FIG. 39. The strip will be held firmly in place by backstop element 142, as shown in FIG. 39.

At this point, the forwardmost clip of the strip, which is exposed at the bottom of the guide body, is placed on the workpiece post on which the clip is to be driven. The operator then actuates the manual trigger 6 and piston 29 and its tip 30 are driven downwardly to their lowermost postions shown in FIG. 2. The cutting edge **31*b* of the driver tip 30 cooperates with the forwardmost edge 78 of bottom plate 77 to shear the forwardmost clip from the strip 13, whereupon the clip is driven home on its workpiece post. The clip is driven past the stationary clip support shoulder 129 as shiftable clip support 132** yields.

As the driver 29 and its tip 30 descend during a clip driving stroke, the driver tip cam surface 31 engages the forward edge of feed cam 99, causing the feed cam 99 to pivot in a counterclockwise direction (as viewed in FIG. 2) so as to shift rearwardly against the action of spring 112. Feed cam 99 carries feed finger 104 rearwardly with it. The feed finger extension 105 rides over the next clip of the strip, against the action of compression spring 110, until it reaches the rearward edge of the second clip, at which point its clip engaging tip 106 contacts the second clip, under the urging of spring 110. At the end of the drive stroke, the second clip becomes the forwardmost clip of the strip. When the driver 29 and its tip 30 return to their normal retracted positions, the driver tip cam surface 31 will no longer engage the edge of feed cam 99, with the result that the feed cam 99 and feed finger 104 will shift forwardly (as viewed in FIG. 2) under the influence of compression spring 112. This forward shifting of the feed finger 104 will cause the clip strip 13 to shift forwardly locating the now forwardmost clip of the strip in the drive track 28. As the clip strip shifts forwardly, the cam surface 147 of backstop element 142 will cause the backstop element to shift away from the strip until its cam surface 146 can engage the rearward edge of that clip which is now the second clip of the strip, as shown in FIG. 39. The backstop element 142 prevents the strip 13 from shifting rearwardly, as the feed finger 104 shifts rearwardly during the driving operation.

The tool is now ready for a next actuation. The tool may be actuated until the strip 13 is exhausted. The last clip of the strip will be properly held in the drive track 28 of guide body 8 by clip support assembly 10 and its stationary clip support 123 and shiftable clip support 132.

When the supply of clips is exhausted, the magazine 12 can be removed and discarded, if disposable. The magazine can be refilled and reused if it is of a reusable character. In either event, the spent magazine can be replaced by a full one, whereupon the clip strip 13 can be again threaded to locate the forwardmost clip in drive track 28 whereupon the tool is again ready for use.

Should it be desired to remove the strip 13 of clips from the clip feed mechanism 9, it is only necessary to manually withdraw the backstop element 142. If the clip strip is also engaged by feed finger tip 106, the feed finger 104 can be raised against the action of spring 110 by engagement of its handle 107 through side plate access port 51.

The tool 1 can be provided with various types of safety devices, assuring that the tool is located over a workpiece before it can be actuated, or preventing actuation of the tool after the last clip of the strip has been applied. Various types of safeties can be used for this purpose, as is well known in the art.

As used herein and in the claims, words such as "vertical", "horizontal", "upwardly", "downwardly", and the like, are used in conjunction with the drawings, for purposes of clarity and explanation. It will be understood by one skilled in the art that the tool 1 can be held in any orientation required for the particular clip application being performed.

Modifications may be made in the application without departing from the spirit of it.

What I claim is:

1. A driving tool and magazine for push-on clips of the type adapted to be engaged on the post of a workpiece and arranged in tandem in a strip wherein each clip comprises an integral one-piece part of the next adjacent clip with a line of weakening therebetween, said tool comprising a body with a handle, a driver mounted in said body together with means to shift said driver between a normal retracted position and a clip applied position, said driver terminating in a tip means to engage the forwardmost clip of said strip, sever said forwardmost clip from said strip and drive said forwardmost clip on to its respective workpiece post, said driver tip having an axial bore to accommodate the post on which said forwardmost clip is to be driven, said body having a lower end, a guide body affixed to said lower end providing a drive track for said driver tip means, a clip feed means affixed to said guide body to advance said clip strip and locate the forwardmost clip of said strip in said drive track after each tool actuation, means to actuate said clip feed means, a removable magazine affixed to said tool and containing said clip strip in coil form, and a support bracket assembly for said magazine, said assembly having a first end affixed to said clip feed means and a second end affixed to said tool handle, said support bracket assembly having a pair of opposed slots in parallel-spaced relationship, said magazine having a pair of external bosses on opposite sides thereof slidably receivable in said slots to removably mount said magazine on said support bracket assembly.

2. A driving tool and magazine for push-on clips of the type adapted to be engaged on the post of a workpiece and arranged in tandem in a strip wherein each clip comprises an integral one-piece part of the next adjacent clip with a line of weakening therebetween, said tool comprising a body with a handle, a driver mounted in said body together with means to shift said driver between a normal retracted position and a clip applied position, said driver terminating in a tip means to engage the forwardmost clip of said strip, sever said forwardmost clip from said strip and drive said forwardmost clip on to its respective workpiece post, said driver tip having an axial bore to accommodate the post on which said forwardmost clip is to be driven, said body having a lower end, a guide body affixed to said lower end providing a drive track for said driver tip means, a clip feed means affixed to said guide body to advance said clip strip and locate the forwardmost clip of said strip in said drive track after each tool actuation, a removable magazine affixed to said tool and containing said clip strip in coil form, and said clip feed means comprising a housing, said housing comprising sides having upper and lower edges and being affixed to said guide body in parallel spaced relationship, a bottom plate affixed to and spanning said bottom edges of said sides and a cover plate affixed to and spanning said upper edges of said sides, a strip guide means mounted within said clip feed housing to form with said bottom plate a channel for said clip strip leading to said drive track, a feed cam pivotally mounted in said clip feed housing, a feed finger pivotally mounted on said feed cam and having an extension engagable with the forwardmost clip of said strip, means biasing said feed finger into engagement with said forwardmost clip of said strip, means biasing said feed cam and said feed finger toward said drive track to locate said forwardmost clip of said strip therein, means to shift said feed cam and said feed finger away from said drive track against the action of their respective biasing means when said driver is shifted from said normal retracted position to said clip applied position causing said feed finger to engage the next clip of said strip, and to release said feed cam upon return of said driver from said clip applied position to said normal retracted position, whereby said feed cam biasing means shifts said feed cam and feed finger toward said dirve track and said next clip, which is now said forwardmost clip, into said drive track.

3. The tool and magazine claimed in claim 2 wherein said guide body has a longitudinal slot therein between said drive track and said clip feed housing, said driver tip having a lug thereon slidable within said slot and extending through said slot into said clip feed housing, said driver tip lug having a cam surface thereon engagable with said feed cam and comprising said means to shift said feed cam and feed finger when said driver is shifted from its normal retracted position to its clip applied position and to release said feed cam upon return of said driver from said clip applied position to said normal retracted position, said driver tip lug having an edge thereon cooperating with an adjacent edge of said bottom plate to sever the forwardmost clip from said strip as said driver shifts from said normal retracted position to said clip applied position.

4. The tool and magazine claimed in claim 3 including a backstop element pivotally mounted in a notch in one of said clip feed housing sides, said backstop being shiftable between a clip strip engaging position and a retracted position, means biasing said backstop to said engaging position, said backstop element having a nose portion with a first surface thereon engaging an edge of the second clip of said strip to preclude shifting of said strip away from said drive track when said backstop is in said engaging position, said backstop nose portion having a second cam surface cooperating with said clip strip to shift said backstop to its retracted position against the action of said biasing means when said clip strip is advanced toward said drive track, and a manually engagable portion on said backstop whereby it can be shifted to said retracted position against the action of said biasing means when it is desired to remove said clip strip from said clip feed housing and said drive track.

5. The tool and magazine claimed in claim 4 wherein said magazine comprises a container containing said clip strip coil, said container comprising circular side walls joined by an annular peripheral wall and a central hub, said peripheral wall having an opening therein, the free end of said clip strip coil extending through said opening and said clip feed means with the forwardmost clip in said drive track.

6. The tool and magazine claimed in claim 5 including a support bracket assembly for said magazine, said assembly having a first end affixed to said clip feed means and a second end affixed to said tool handle, said support bracket assembly having a pair of opposed slots in parallel-spaced relationship, said magazine having a pair of external bosses on opposite sides thereof slidably receivable in said slots to removably mount said magazine on said support bracket assembly.

7. The tool and magazine claimed in claim 6 including a clip support assembly for said guide body, said clip support assembly comprising a support assembly frame affixed to said guide body, a replaceable stationary support mounted on said frame and so positioned with respect to said drive track as to support one side of a clip located therein, a shiftable support pivotally mounted on said frame and shiftable between a normal position and a retracted position, when in said normal position said shiftable support is so positioned with respect to said drive track as to support that side of a clip in said drive track opposite the side supported by said fixed support, means biasing said shiftable support to its normal position, said shiftable support being shifted to said retracted position when said clip in said drive track is driven on its post by said driver.

8. The tool and magazine claim in claim 7 wherein said magazine is molded of plastic material and comprises a single use disposable magazine.

9. The tool and magazine claimed in claim 7 wherein said magazine is molded of plastic material and comprises a refillable and reusable magazine.

10. The tool and magazine claimed in claim 7 wherein said tool is a trigger actuated pneumatically powered tool.

* * * * *